Patented Oct. 16, 1951

2,571,666

UNITED STATES PATENT OFFICE 2,571,666

OXIDATION OF MERCAPTANS

Donald C. Bond, Northbrook, and Michael Savoy, Chicago, Ill., assignors to The Pure Oil Company, Chicago, Ill., a corporation of Ohio No Drawing. Application October 25, 1947, Serial No. 782,214

4 Claims. (Cl. 196—29)

This invention relates to the oxidation of mercaptains and is particularly concerned with a method for oxidizing mercaptans to disulfides in the presence of alkali solutions.

An object of the invention is to provide a method for oxidizing mercaptans to disulfides.

Another object of the invention is to provide a method for sweetening gasoline, kerosene and other hydrocarbon liquids containing mercaptans.

Still another object of the invention is to provide a method for regenerating alkali solutions which have been used to extract mercaptans from hydrocarbon liquids.

Other objects of the invention will be apparent from the following description.

We have discovered that certain quinones are excellent catalysts for promoting the oxidation of mercaptans to disulfides by means of oxygen or gas containing free oxygen such as air in the presence of alkali solutions.

Quinones which have at least one unsubstituted hydrogen atom in the ring will in general catalyze the oxidation of mercaptans to disulfides. Those quinones in which all hydrogen atoms in the quinonoid ring are substituted by hydroxyl groups or by substituents which hydrolyze to hydroxyl groups are ineffective in catalyzing the oxidation of mercaptans to disulfides in the presence of alkali solutions. Compound ring quinones in which the two hydrogen atoms of the quinonoid ring are substituted by hydroxyl groups or by substituents which are hydrolyzed to hydroxyl groups have such low catalytic effect as to be substantially useless as catalysts. Substitution of alkyl groups for hydrogen in the quinonoid ring improves the catalytic properties of the quinone, and this is particularly true where the alkyl group is a branched chain. Compound aromatic rings in which the quinonoid oxygen atoms are in positions ortho to each other are more effective as oxidation catalysts than similar compounds in which the quinonoid oxygen atoms are para to each other.

In order to demonstrate the foregoing facts, a number of different quinones were tested in accordance with a standard test as follows: a 50 cc. sample of caustic soda solution containing 10% by weight of sodium hydroxide, 1% by weight of catalyst, and 1% by weight of sulfur in the form of normal butyl mercaptan was placed in a 100 cc. graduated cylinder containing 75 cc. of No. 4 glass beads.

A tube was placed in the cylinder so that the bottom thereof extended to the bottom of the cylinder, and air was passed through the tube and bubbled through the solution for one hour at the rate of 0.03 cubic feet per hour at a temperature of approximately 75° F. at the end of the bubbling period the mixture was analyzed for disulfides in order to determine the amount of mercaptan that was oxidized. The various solutions tested and the per cent of mercaptan oxidized in each test is given in the following Table I.

Table I

| Catalyst | Solvent | Per Cent by Wt. of N-Butyl Mercaptan Oxidized |
|---|---|---|
| 1,2-Naphthoquinone | Water | 68.1 |
| Do | Formula 30 alcohol | 83.3 |
| 2,5-Ditertiarybutylquinone | do | 89.8 |
| Thymoquinone | do | 57.4 |
| Benzoquinone | Water | 7.7 |
| 1,4-Naphthoquinone | do | 11.8 |
| Do | Formula 30 alcohol | 14.0 |
| p-Toluquinone | Water | 20.3 |
| p-Xyloquinone | do | 27.2 |
| Duroquinone | Formula 30 alcohol | 27.4 |
| Tetrahydroxyquinone | Water | 1.3 |
| Tetrachlorohydroquinone | do | 0.9 |
| 2.3-Dichloronaphthoquinone | do | 3.4 |
| Chloranil | do | 52.5 |
| Chloranilic acid | Formula 30 alcohol | 14.0 |
| None | Water | 0.9 |
| None | Formula 30 alcohol | 8.4 |

From the table it will be seen that 1,2-naphthoquinone, a compound ring quinone in which the quinonoid oxygen atoms are in positions ortho to each other, oxidized 68.1% by weight of mercaptan in water solution and 83.3% of mercaptan in Formula 30 alcohol. 2,5-ditertiarybutylquinone, a quinone in which one of the hydrogen atoms of the quinonoid ring is substituted by a branched chain alkyl group, oxidized 89.8% of mercaptan in Formula 30 alcohol. Thymoquinone is another example of a quinone in which a hydrogen atom in the quinonoid ring is substituted with a branched chain alkyl group.

Contrasted with 1,2-naphthoquinone, 1,4-naphthoquinone, which is a compound ring quinone in which the quinonoid oxygen atoms are in positions para to each other, oxidized a comparatively small amount of mercaptan, namely, 11.8% in water solution and 14% in Formula 30 alcohol.

Para-toluquinone, para-xyloquinone and duroquinone demonstrate the enhanced oxidation effect obtained by substituting alkyl groups for hydrogen in the quinonoid ring.

On the other hand tetrahydroxyquinone and tetrachlorohydroquinone demonstrate the inhibiting effect produced by substituting all the hydrogen atoms in the quinonoid ring with hydroxy groups or with substituents (in this case chlorine), which hydrolyze to hydroxy groups. Chloranil, a quinonoid ring containing four chlorine atoms and chloranilic acid, a quinonoid ring containing two chlorine atoms and two hydroxy groups, appear from the data in Table I to be exceptions to the rule that substitution of all hydrogen in the quinonoid ring by hydroxyl or hydrolyzable substituents destroys the catalytic effect of the compound. It will be shown later, however, that although these two compounds have an initial effect, they rapidly lose their catalytic property and become substantially worthless. The initial activity of these compounds and the rapid loss of activity may be accounted for by the fact that hydrolysis does not occur immediately, and that the compounds are active until the chlorine atoms are hydrolyzed.

2,3-dichloronaphthoquinone is exemplary of compound ring quinones in which all hydrogen atoms of the quinonoid ring are substituted by either hydroxyl groups or by substituents which hydrolyze to hydroxy groups. Compounds of this type have relatively low catalytic value.

In order to demonstrate the fact that the catalytic property of the quinones in promoting oxidation is not due to the oxidizing effect alone of the quinone, a number of quinones were tested in both aqueous alkali solutions and in alcoholic alkali solutions. In these tests n-butyl mercaptan equivalent to 1% by weight of sulfur based on the solution was added thereto, and the solution was placed in a tube in contact with air and shaken for a certain period of time after which the per cent of mercaptan-sulfur remaining in the solution was determined. Enough mercaptan was then added to the solution to restore the mercaptan-sulfur value to 1% and the shaking with air was repeated. This process was repeated a number of times in order to determine the amount of mercaptan oxidized after each addition of mercaptan. The solutions tested and the results obtained are given in the following Table II.

By referring to Table II it will be seen that 2,5-ditertiary butyl quinone after a series of eleven tests was substantially as effective as it was initially. Thymoquinone began falling off in activity after the fourth regeneration. This may have been due to destruction of the thymoquinone due to over-oxidation as indicated by the fact that in the first three regenerations substantially all the mercaptan was oxidized. Duroquinone maintained its activity over five regenerations. Naphthoquinone began losing activity after the sixth regeneration, and here again the loss in activity may be accounted for by oxidative destruction of the catalyst because of over-oxidation.

On the other hand chloranil lost catalytic effect very rapidly as shown by the fact that the amount of mercaptan left in the solution approximately doubled after each regeneration. In the test made with chloranilic acid, the compound had substantially no catalytic effect.

In accordance with our invention mercaptans to be oxidized may be dissolved in the alkali solution, either aqueous or alcoholic, or an aqueous-alcohol alkali solution to which has been added a small amount of the catalyst. Although in all the tests reported in the tables 1% by weight of quinone was used as catalyst, this amount was used in all tests merely for purposes of comparison. The amount of catalyst may vary in amounts from approximately 0.1% to 3% by weight of the alkali solution. The alkali may be either sodium or potassium hydroxide and solutions containing approximately 5% to 25% by weight of alkali are suitable. Where it is desired to sweeten hydrocarbon distillates such as gasoline or kerosene, the distillate is brought into intimate contact with the alkali solution containing the quinone while bubbling air therethrough. When used in this way, the mercaptans contained in the gasoline are converted to disulfides which Table II

| Initial Composition of Solution | Cc. Soln. | No. of Regenerations | Time of Shaking, Min. | Cu. Ft. of air | Per Cent RSH-S | |
|---|---|---|---|---|---|---|
| | | | | | Before | After air Contact |
| 10% Alcoholic NaOH<br>1% 2,5 Ditertiary butyl quinone<br>1% S as n-C$_4$H$_9$SH | 250 | 1<br>2<br>3<br>4<br>5<br>6<br>7<br>8<br>9<br>10<br>11 | 6<br>6<br>6<br>6<br>6<br>6<br>6<br>6<br>6<br>6<br>6 | 0.10<br>0.10<br>0.10<br>0.10<br>0.10<br>0.10<br>0.10<br>0.10<br>0.10<br>0.10<br>0.10 | 1.00<br>1.00<br>1.00<br>1.00<br>1.00<br>1.00<br>1.00<br>1.00<br>1.00<br>1.00<br>1.00 | 0.06<br>0.08<br>0.12<br>0.07<br>0.09<br>0.05<br>[1] 0.03<br>0.43<br>0.23<br>0.14<br>[2] 0.07 |
| 10% Alcoholic NaOH<br>1% Thymoquinone<br>1% S as n-C$_4$H$_9$SH | 250 | 1<br>2<br>3<br>4<br>5<br>6 | 6<br>6<br>6<br>6<br>6<br>6 | 0.10<br>0.10<br>0.10<br>0.10<br>0.10<br>0.10 | 1.00<br>1.00<br>1.00<br>1.00<br>1.00<br>1.00 | 0.00<br>0.01<br>0.01<br>0.03<br>0.18<br>0.58 |
| 10% Alcoholic NaOH<br>1% Duroquinone<br>1% S as n-C$_4$H$_9$SH | 90<br>90 | 1<br>2<br>3<br>4<br>5 | 6<br>6<br>6<br>6<br>6 | 0.036<br>0.036<br>0.036<br>0.036<br>0.036 | 1.00<br>1.00<br>1.00<br>1.00<br>1.00 | 0.03<br>0.16<br>0.08<br>0.17<br>0.16 |
| 10% Aqueous NaOH<br>1% Chloranil<br>1% S as n-C$_4$H$_9$SH | 250 | 1<br>2<br>3 | 6<br>6<br>6 | 0.10<br>0.10<br>0.10 | 1.00<br>1.00<br>1.00 | 0.24<br>0.41<br>0.88 |
| 10% Alcoholic NaOH<br>1% Chloranilic acid<br>1% S as n-C$_4$H$_9$SH | 250 | 1<br>2<br>3 | 6<br>12<br>18 | 0.10<br>0.20<br>0.30 | 1.00<br>1.00<br>1.00 | 1.00<br>1.08<br>0.99 |
| 10% Alcoholic NaOH<br>10% 1,2-Naphthoquinone<br>1% S as n-C$_4$H$_9$SH | 250 | 1<br>2<br>3<br>4<br>5<br>6<br>7 | 12<br>12<br>12<br>6<br>6<br>3<br>3 | 0.20<br>0.20<br>0.20<br>0.10<br>0.10<br>0.05<br>0.05 | 1.00<br>1.00<br>1.00<br>1.00<br>1.00<br>1.00<br>1.00 | 0.01<br>0.01<br>0.00<br>0.01<br>0.01<br>0.08<br>0.27 |

[1] Solution stood overnight after air-blowing. RSH added just before regeneration No. 8.
[2] Droppped to 0.01 after standing 20 hours.

remain in solution in the gasoline. The amount of alkali solution used is not critical, but may suitably vary from 6% to 50% by volume of the hydrocarbon liquid being treated. If it is desired to use quinones for regenerating alkali solutions containing mercaptans extracted from hydrocarbon distillates, it is preferable to extract mercaptans from the distillate in the substantial absence of air prior to adding the quinone to the alkali solution in order to prevent oxidation of the mercaptans in situ in the gasoline. The quinone may then be added to the used alkali after extraction but prior to regeneration and the amount used should be calculated so that the mercaptan contained in the alkali is capable of reducing the total amount of quinone added. Any quinone added as make-up should be added in the same manner. After the alkali solution has been regenerated, the solution can be contacted with mercaptan-containing distillate without producing any substantial amount of oxidation of mercaptan in situ. In the extraction operation the alkali solution should contain at least 10% by weight of sodium and/or potassium hydroxide in order to obtain good extraction of mercaptans.

It will be understood that alkali solutions may be used which contain solutizers such as isobutyric acid or alkali metal isobutyrates and naphthenic acids or alkali metal naphthenates together with cresols in order to obtain better extraction of mercaptans from petroleum distillates or to obtain more intimate contact between the alkali solutions and the mercaptans or distillate subjected to oxidation. Any solvent may be used in preparing the alkali solution in which hydrocarbons and disulfides are insoluble or only slightly soluble.

Caution should be exercised not to completely exhaust mercaptans from the solution undergoing oxidation in the presence of the catalyst since destructive oxidation of the catalyst occurs in the absence of mercaptans. Where complete oxidation of mercaptans to disulfides is desired, more frequent renewal of the catalyst will be necessary. In the regeneration of used alkali the catalyst is protected against destructive oxidation by leaving approximately 0.1% to 0.2% of mercaptan sulfur in the alkali solution.

Although it has been previously indicated that our catalysts are effective at ordinary atmospheric conditions, oxidation may be effected under superatmospheric pressure and at slightly elevated temperatures up to approximately 150° F. Higher temperatures have a detrimental effect on the life of the catalyst.

What is claimed is:

1. A method of sweetening hydrocarbon liquids containing mercaptans comprising intimately contacting said liquid with air and alkali solution containing a small amount of a quinone selected from the group consisting of thymoquinone; 2,5-ditertiary butylquinone; 1,2-naphthoquinone.

2. A method in accordance with claim 1 in which the quinone is thymoquinone.

3. A method in accordance with claim 1 in which the quinone is 2,5-ditertiary butylquinone.

4. A method in accordance with claim 1 in which the quinone is 1,2-naphthoquinone.

DONALD C. BOND.
MICHAEL SAVOY.

REFERENCES CITED

The following references are of record in the file of this patent:

UNITED STATES PATENTS

| Number | Name | Date |
|---|---|---|
| 2,015,038 | Pevere | Sept. 17, 1935 |
| 2,413,945 | Bolt | Jan. 7, 1947 |
| 2,426,087 | Fetterly | Aug. 19, 1947 |
| 2,427,212 | Henderson et al. | Sept. 9, 1947 |

FOREIGN PATENTS

| Number | Country | Date |
|---|---|---|
| 17,975 | Hungary | Mar. 17, 1941 |

OTHER REFERENCES

Bond, "Regeneration of Caustic Solutions—Catalytic Air Oxidation," Reprint from Oil and Gas Journal (Dec. 8, 1945).